(12) United States Patent
Perrow

(10) Patent No.: US 6,758,758 B2
(45) Date of Patent: Jul. 6, 2004

(54) TRIPOT UNIVERSAL JOINT

(75) Inventor: Scott Jay Perrow, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 4 days.

(21) Appl. No.: 10/172,077

(22) Filed: Jun. 14, 2002

(65) Prior Publication Data

US 2003/0232654 A1 Dec. 18, 2003

(51) Int. Cl.[7] .............................................. F16D 3/205
(52) U.S. Cl. ..................................... 464/111; 464/124
(58) Field of Search ................................. 464/111, 115, 464/120, 122, 123, 124, 127, 129, 905; 403/122, 124

(56) References Cited

U.S. PATENT DOCUMENTS

| | | | |
|---|---|---|---|
| 4,589,856 A | | 5/1986 | Mazziotti et al. |
| 4,674,993 A | | 6/1987 | Mazziotti et al. |
| 4,854,917 A | | 8/1989 | Mizukoshi |
| 5,203,741 A | * | 4/1993 | Turner ........................ 464/111 |
| 5,256,107 A | * | 10/1993 | Matsumoto et al. ........ 464/111 |
| 5,299,981 A | * | 4/1994 | Poulin et al. ............... 464/111 |
| 5,376,049 A | * | 12/1994 | Welschof et al. ........... 464/111 |
| 5,380,249 A | * | 1/1995 | Krude ........................ 464/111 |
| 5,391,013 A | * | 2/1995 | Ricks et al. ................. 403/59 |
| 6,176,787 B1 | * | 1/2001 | Oh ............................. 464/111 |

* cited by examiner

Primary Examiner—David Bochna
Assistant Examiner—Kenneth Thompson
(74) Attorney, Agent, or Firm—Michael D. Smith

(57) ABSTRACT

A telescopic tripot universal joint comprises an outer drive member having three longitudinal drive channels which include two opposing concave side surfaces, an inner drive member having three radial trunnions having a radially outward facing semi-spherical surface for tiltably mounting a drive ball assembly which has a bearing train disposed radially between an inner ball tiltably engaged to the trunnion and an outer ball having a tread face which directly opposes the concave side surfaces of the drive channels. The ball assembly being free to wobble about a Z-axis wherein the assembly pivots about an X-axis disposed laterally to the outer drive member and pivots about a Y-axis disposed longitudinally to the outer drive member. The channel carries a guide rail which extends longitudinally lengthwise to the channel and projects radially inward in order to contact the outer ball when the ball assembly pivots about the X-axis, i.e., tilts relative to the axis of the outer drive member.

14 Claims, 5 Drawing Sheets

TRIPOT UNIVERSAL JOINT

TECHNICAL FIELD

This invention relates to a universal joint and more particularly a tripot universal joint.

BACKGROUND OF THE INVENTION

Tripot universal joints are typically employed in automotive axial driveshafts and especially in front-wheel-drive vehicles between the transaxial differential and the driving wheel. The telescopic constant velocity joint such as the tripot should not only transmit the torque at various speeds, angles and telescopic positions but also prevent any vibrations of the engine from being transmitted through the joint and driveshaft to the driving wheel and the vehicle structure. In addition, when the universal joint operates at an angle it should not produce any oscillating axial excitation which may be capable of initiating vibrations in the driveshaft or in the structure of the vehicle.

U.S. Pat. No. 3,125,870 granted to Michael Orain, Mar. 24, 1964, discloses a conventional telescopic type tripot universal joint of the prior art, which has one of the best stroking type universal joints available for osculating engine vibrations from the rest of the vehicle. However, these conventional prior art tripot universal joints due to their operating friction characteristics produce internally generated osculating axial forces which are related to the transmitted torque angles. During severe accelerations at low vehicle speeds these cyclic axial forces can be of sufficient magnitude to produce a shudder type disturbance which has a frequency equal to three times the shaft speed.

To reduce this shudder or vehicle ride disturbance, the generated axial forces must be reduced. This reduction is accomplished by tracking an outer ball or ball assembly of the tripot universal joint relative an axis of the housing. Effective tracking of the outer ball to reduce shudder must have a housing ball bore designed to minimize the outer or ball assemble tip and/or reduce binding of the ball within the track when it does tip. However, ball tip occurs about two axes, the X-axis and Z-axis. The problem with previous designs is the effectiveness at preventing ball tip about the x-axis. The inability to prevent ball tip results in increased generated axial forces which lead to shudder.

SUMMARY OF THE INVENTION

A telescopic universal joint comprises a first drive member having a first longitudinal axis engaged flexibly to a second drive member having a second longitudinal axis. The first and second longitudinal axis are co-linear to one another, or zero degreed, when the joint is not flexed. The first drive member defining three longitudinal drive channels spaced circumferentially from another. Each channel has two opposing concave side surfaces spaced circumferentially apart by a back surface facing radially inward. Three trunnions of the second drive member are disposed respectively within the three channels. Each trunnion has a radial axis all lying within an imaginary plane and intersecting at a spider center lying along the second longitudinal axis.

Rotating and wobbling about each trunnion and generally about a Z-axis is a ball assembly having an outer ball which is in rolling contact with one of the two opposing concave side surfaces of the first member. The perceived wobble of the ball assembly is created by the assembly pivoting about a Y-axis disposed parallel to the channel, and pivoting about an X-axis disposed laterally to the channel, or and axis lying within the X-Y plane. Pivoting of the ball assembly about the X-axis is restricted by a central guide rail projecting radially inward from the back surface of the channel and extending longitudinally lengthwise along the channel. The ball assembly ceases to pivot about the X-axis when a radial side wall of the outer ball contacts the guide rail. By limiting this pivoting action, binding of the ball assembly against the side surfaces of the channel is minimized by redistributing the forces which would otherwise concentrate against the side surfaces.

An advantage of the present invention is the reduction of outer ball binding with the channel by eliminating contact between the tread face of the outer ball and the unloaded side surface of the channel regardless of universal joint angle.

Yet another advantage of the present invention is the reduction of universal joint shudder.

BRIEF DESCRIPTION OF THE DRAWINGS

The presently preferred embodiments of the invention are disclosed in the following description and in the accompanying drawings wherein.

DETAILED DESCRIPTION OF THE PREFERRED EMBODIMENTS

Figure 1:
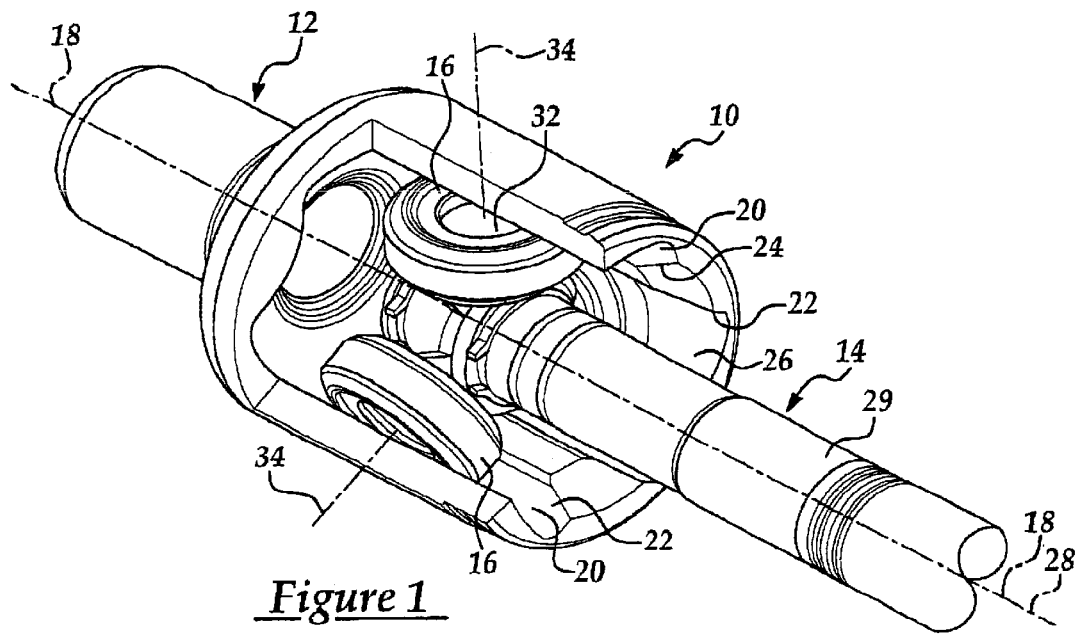
FIG. 1 is a longitudinal perspective view of a tripot universal joint of the present invention with portions of an outer drive member removed to show internal detail.
Figure 2:
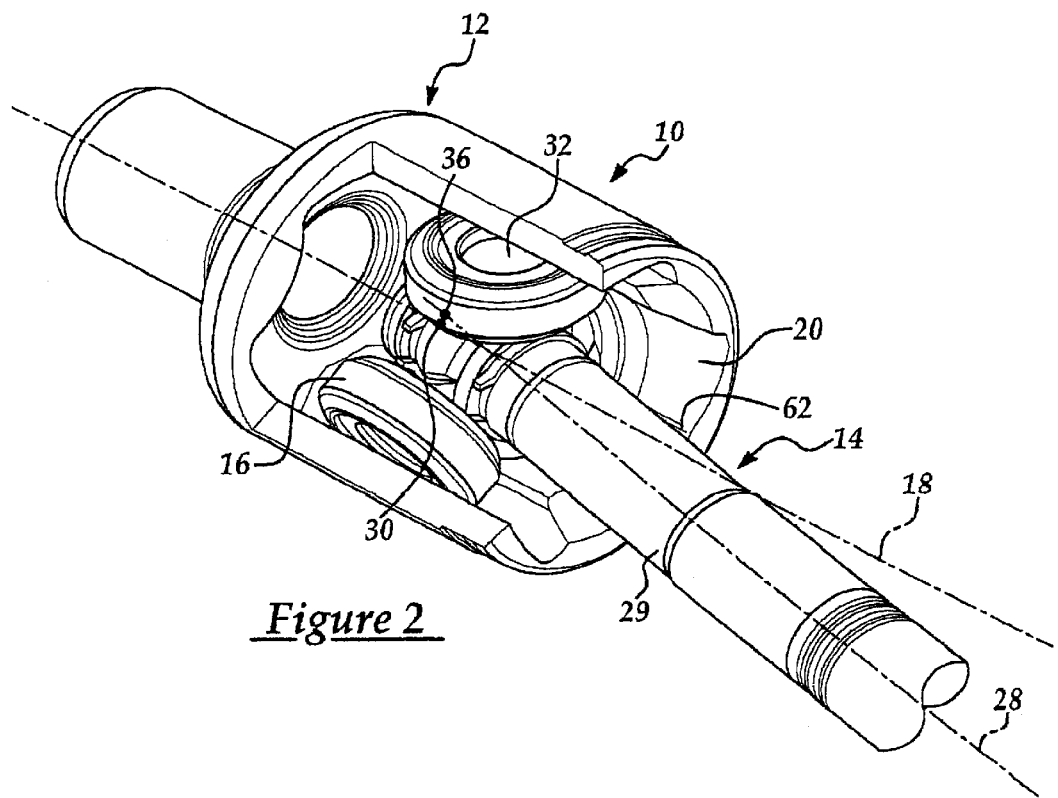
FIG. 2 is a perspective view of the tripot universal joint with a an inner drive member of the universal joint angled with respect to the outer drive member.
Figure 3:
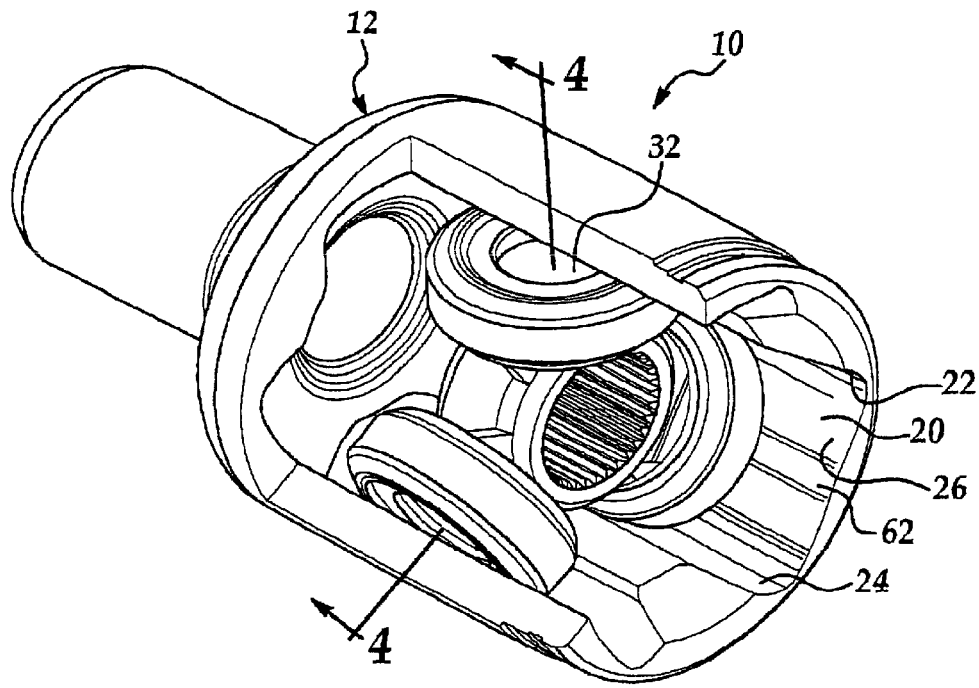
FIG. 3 is a perspective view of the universal joint similar to FIG. 1 except with a shaft of the inner drive member removed to show internal detail.

Referring now to the drawings the invention is illustrated in conjunction with a tripot universal joint 10 which comprises a housing or outer drive member 12, an inner drive member 14 and three drive roller or semi-spherical ball assemblies 16 shaped generally like an oblate spheroid. The outer drive member 12 has a longitudinal axis 18 about which it rotates and three radial drive channels 20 which are equally spaced at substantially 120 degrees from each other. The longitudinal drive channels 20 may be straight, having center lines which are parallel to the longitudinal axis 18 as shown in the drawings or helical, having center lines which are at a small angle such as six degrees, with respect to the longitudinal axis 18. In any event each radial drive channel 20 has two opposing concave side surfaces 22, 24 separated circumferentially by a longitudinal back surface 26 which faces radially inward. The inner drive member 14 has a shaft 29 and a longitudinal axis 28 about which the shaft rotates. The longitudinal axis 18 and 28 coincide or are co-linear when the tripot universal joint 10 is at zero angle, as shown in FIG. 1, and intersects at a point on the longitudinal axis 18 which is based from a joint center 30 when the tripot universal joint 10 is articulated or bent at an angle as shown in FIG. 2.

Figure 4:
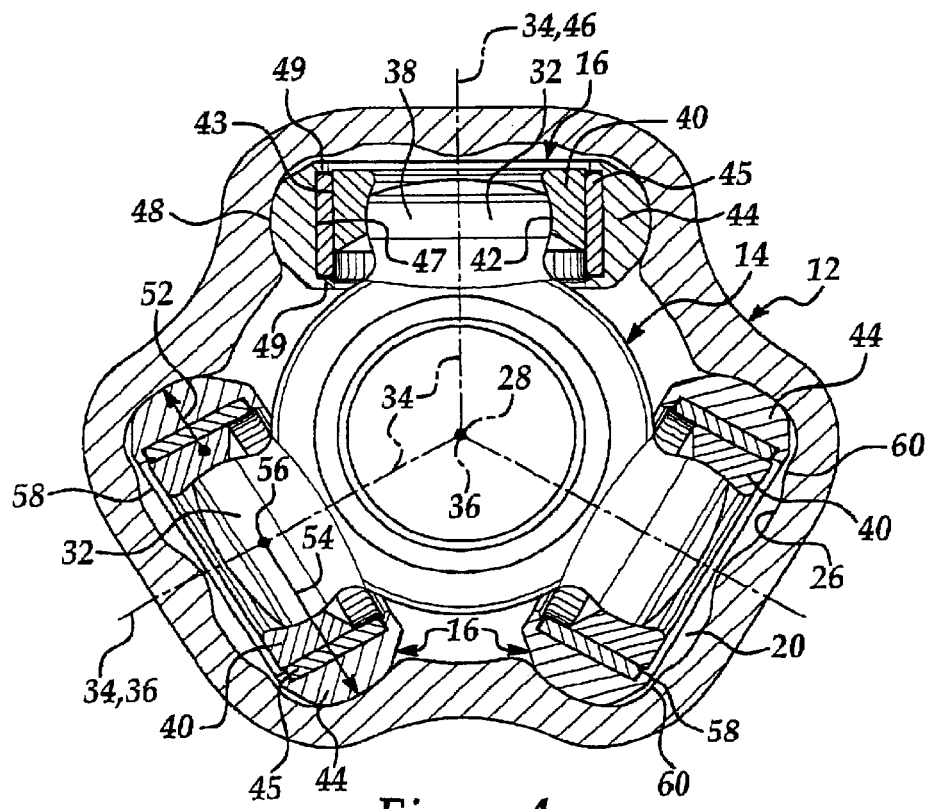
FIG. 4 is a lateral cross section view of the tripot universal joint taken along line 4—4 viewing in the direction of the arrows of FIG. 3.

The inner drive member 14 has three radial trunnions 32 equally spaced at 120 degrees from each other on co-planar radial axis 34 which intersect the longitudinal axis 28 perpendicularly at a spider center 36, as best shown in FIG. 4. The spider center 36 which lies on the longitudinal axis 18 of the outer drive member 12 at zero angle is displaced radially from the longitudinal axis 18 and orbits around the joint center 30, as best shown in FIG. 2, at three times the joint speed when the tripot universal joint 10 is articulated and rotated at a given speed.

Referring to FIG. 4, each one of the radial trunnions 32 have a convex or semi-spherical surface 38 which is concentric to the radial axis 34. The ball assemblies 16 are mounted on the radial trunnions 32 both rotatably and pivotally. Disposed directly radially outward from the semi-spherical surface 38 of the trunnion 32 is an annular inner roller or ball 40 which has an inner radial concave mating surface 42 which conforms to the semi-spherical surface 38 of the trunnion 32 so that the ball assembly 16 can tilt or pivot with respect to the radial axis 34 of the trunnion 32. An annular outer ball 44 of the ball assembly 16 rotates with respect to the inner ball 40 via a train of needle bearings or rollers 45 disposed directly radially between the outer ball 44 and the inner ball 40.

The inner ball 40 has a substantially cylindrical outer surface 43 which faces a substantially cylindrical inner surface 47 of the outer ball 44. The needle bearings 45 rotate directly between the outer and inner surfaces 43, 47 and are held axially in place by two thrust shoulders 49 projecting radially inward from the outer ball 44. The movement between the outer ball 44 and the inner ball 40 is rotational about a centerline 46. The moving relationship between the inner ball 40 and the respective trunnion 32 is generally pivotal with minimal rotation, thereby lending itself to wobble.

Figures 7, 8, 9:
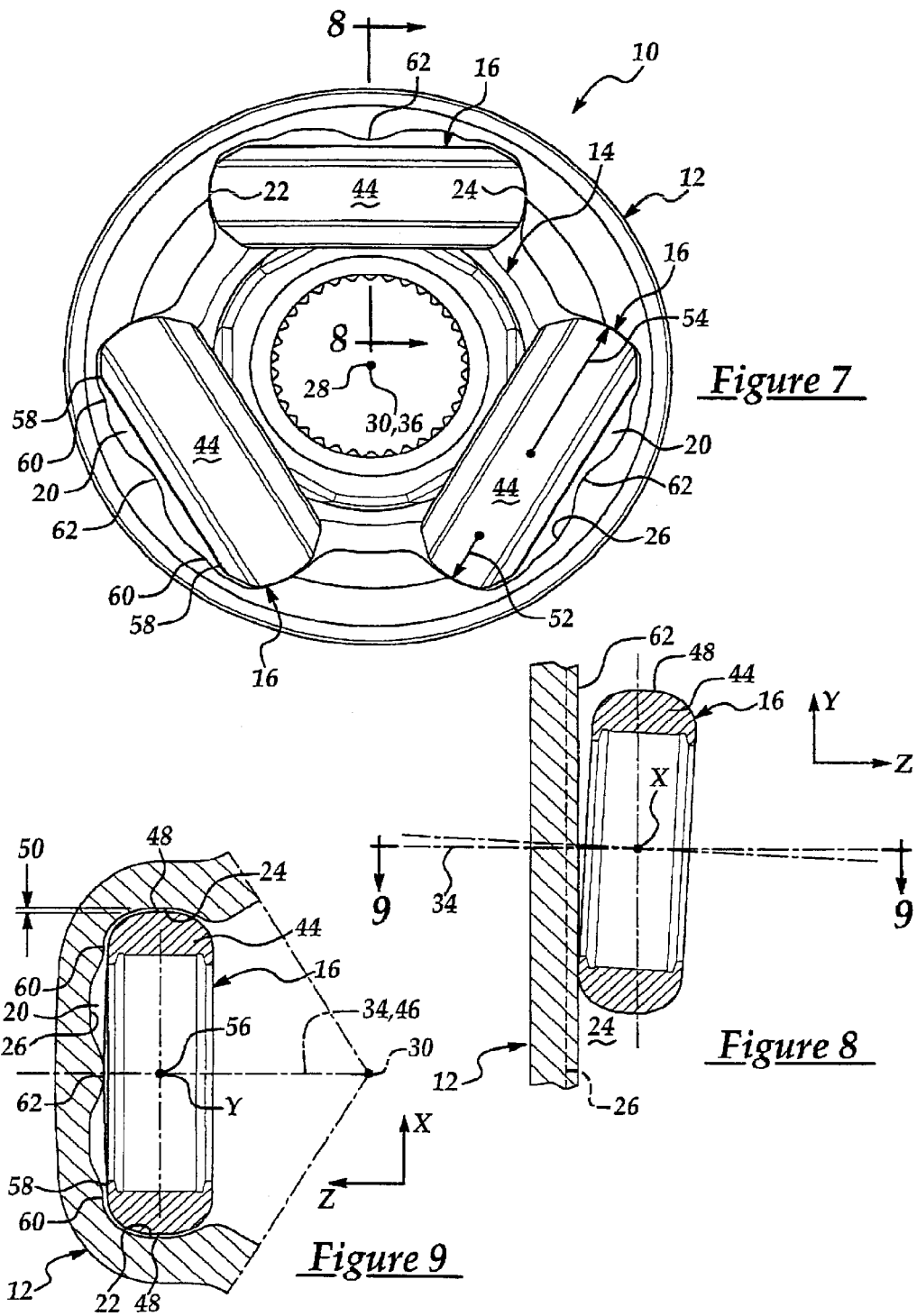
FIG. 7 is an end view of the tripot universal joint.
FIG. 8 is a partial longitudinal cross section view of the universal joint taken along line 8—8 viewing in the direction of the arrows of FIG. 7.
FIG. 9 is a partial lateral cross section view of the tripot universal joint taken along line 9—9 viewing in the direction of the arrows of FIG. 8.

The center line 46 is co-linear, or at zero angle, to the radial axis 34 of the trunnion 32 when the first longitudinal axis 18 of the outer drive member 12 is disposed co-linear to the second longitudinal axis 28 of the inner drive member 14. As best shown in FIG. 8, however, the centerline 46 is not at zero angle to the radial axis 34 when the ball assembly is tilted or when axis 18 is at zero angle to axis 28.

The outer ball 44 has a radially outward facing tread face 48 having a convex cross section profile and which rotatably engages one of the two opposing concave side surfaces 22, 24 which depends upon the rotational direction of the universal joint 10. The other or opposing side surface, being side surface 24 as illustrated in FIG. 9, is spaced from the diametrically opposite side of the tread face 48 by a clearance 50 when the longitudinal axis 18 of the outer drive member 12 is co-linear to the longitudinal axis 28 of the inner drive member 14, or at zero angle, and wherein the centerline 46 of the ball assembly 16 is also at substantially zero-angle to the radial axis 34 of the trunnion 32. The drive ball assembly 16 is thereby free to roll within the drive channel 20 of the housing or outer drive member 12. When the drive members 12, 14 are not at zero angle to one-another, the ball assemblies 16 are slightly cocked within the channel 20 causing the outer ball 44 to run against portions of the back surface 26 and/or the side surface 24 as the outer ball 44 rolls against the side surface 22, as best illustrated in FIG. 9.

Referring to FIGS. 8–9, the three dimensional movement of ball assembly 16 (i.e. rotation and wobble) may better be described within an X–Y–Z axis orientation. The outer ball 44 rotates generally about the Z-axis which lies along the radial axis 34 of the trunnion 32. The Y-axis extends longitudinally with respect to the outer drive member 12, and the X-axis is generally tangential or extends laterally with respect to member 12. The inner ball 40 and subsequently the ball assembly 16 wobbles as it rotates about the Z-axis via pivoting about the X-axis and/or the Y-axis or any axis lying within the X–Y plane. The universal joint shudder of particular interest in the present invention is caused by the ball assembly 16 pivoting action about the X-axis, as best shown in FIG. 8.

Referring to FIGS. 4, 8 and 9, the curvature of the tread face 48 conforms to the concave surfaces 22, 24. The concave side surfaces have a lateral cross-section profile having a radius 52 which is considerably less than a maximum radius 54 of the tread face 48 which measures from a center point 56 of the ball assembly 16 to an apex of the convex tread face profile, so that the maximum radius 54 extends radially inward with respect to the ball assembly 16 from the apex and transversely to the centerline 46 upon which the center point 56 lies. The short radius 52 of the concave side surfaces 22, 24 limits the pivoting action of the ball assembly 16 about the Y-axis while holding the ball assembly 16 within the channel 20. In other words, the clearance 50 disappears when the ball assembly pivots about the Y-axis and the tread face 48 contacts a radially inward portion of side surface 24.

To minimize binding at this contact point on the side surface 24, an outward radial side wall 58 of the outer ball 44 simultaneously contacts a guide wall 60 carried by and extended longitudinally lengthwise along the back surface 26 of the drive channel 20 when the universal joint 10 is generally furthest from zero angle. Like the short radius 52 of the side walls 22, 24 the guide walls 60 minimize pivoting action of the ball assembly 16 about the Y-axis.

Figure 10:
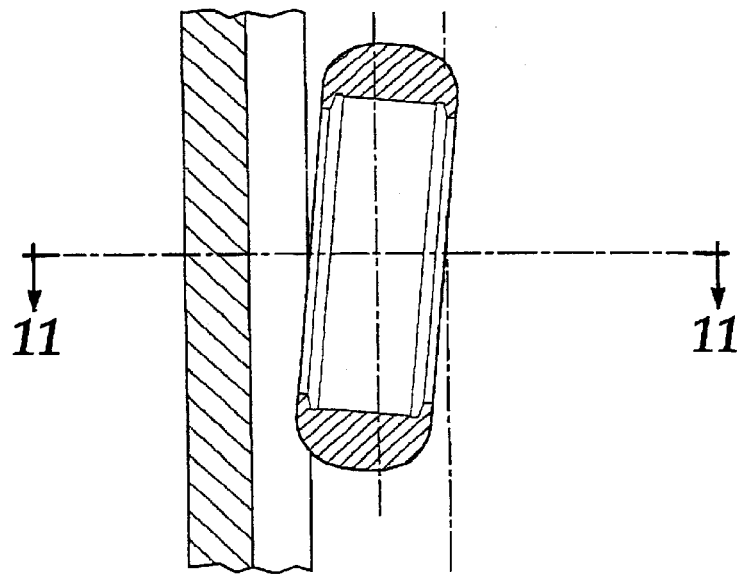
FIG. 10 is a partial longitudinal cross section view of prior art similar in perspective to FIG. 8.
Figure 11:
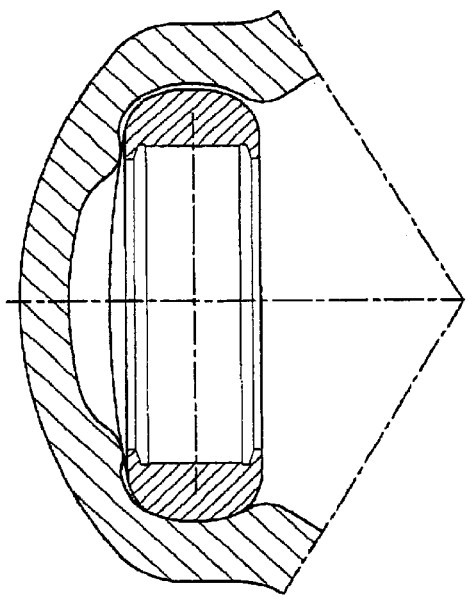
FIG. 11 is a partial lateral cross section view of prior art similar in perspective to FIG. 9.

A center guide rail 62 limits pivoting action of the ball assembly 16 about the X-axis. Guide rail 62 projects radially inward from the back surface 26 of the channel 20 and is disposed substantially parallel to and equally spaced between the two guide walls 60. When the ball assembly 16 pivots about the X-axis, the outward radial side wall 58 of the outer ball 44 contacts the guide rail 62, restricting the pivoting action and minimizing the binding tendency of the outer ball 44 against the side surfaces 22, 24. The advantage of the guide rail 62 and the restriction of pivoting is provides about the X-axis is best contrasted between prior art FIGS. 10 and 11 which have no guide rails 62 and FIGS. 8 and 9 of the present invention which show the guide rails 62. The guide rails 62 reduce pivoting about the X-axis thus reduce the opportunity of ball assembly 16 binding against the unloaded side surface 22 or side surface 24.

Figure 5:
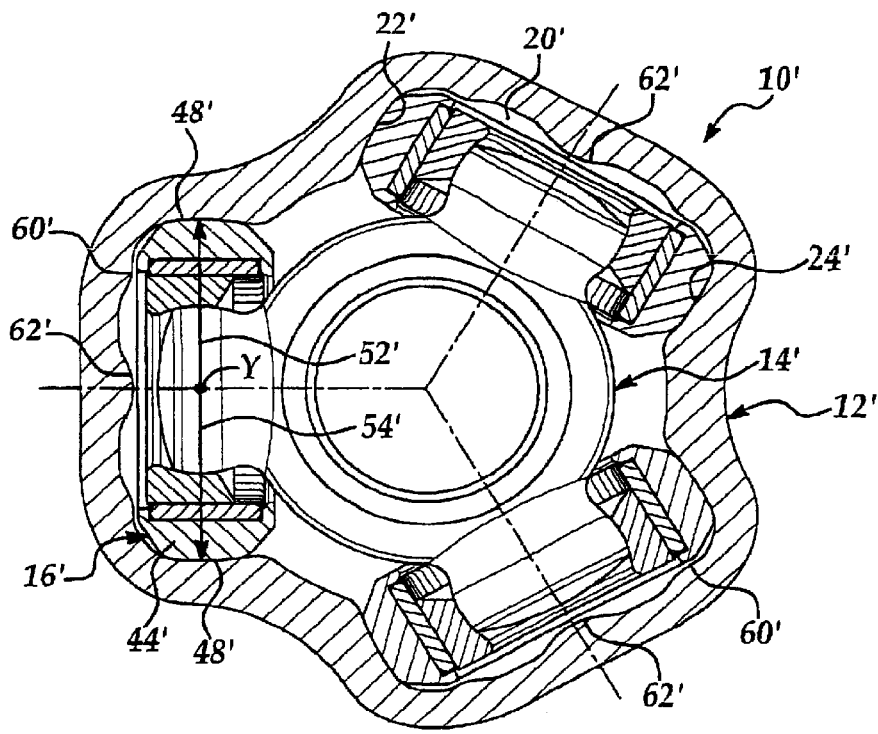
FIG. 5 is a lateral cross section view of a second embodiment of a tripot universal joint similar to FIG. 4.

FIG. 5 is a second embodiment of a tripot universal joint 10' of the present invention. Contrary to the first embodiment, two opposing side surfaces 22', 24' of a channel 20' of universal joint 10' have a cross section profile with a radius 52' which is substantially equal to a maximum radius 54' of an outer ball 44'. Because radius 52' equals maximum radius 54', the tread face 48' will not bind upon either side surface 22', 24' when the ball assembly 16' pivots about the Y-axis. Regardless, the channel 20' carries a pair of guide walls 60' which, like the first embodiment, minimize ball assembly pivoting about the Y-axis. This, when combined with the guide rail 62' assures the ball assembly 16' properly tracks within the channel 20'.

Figure 6:
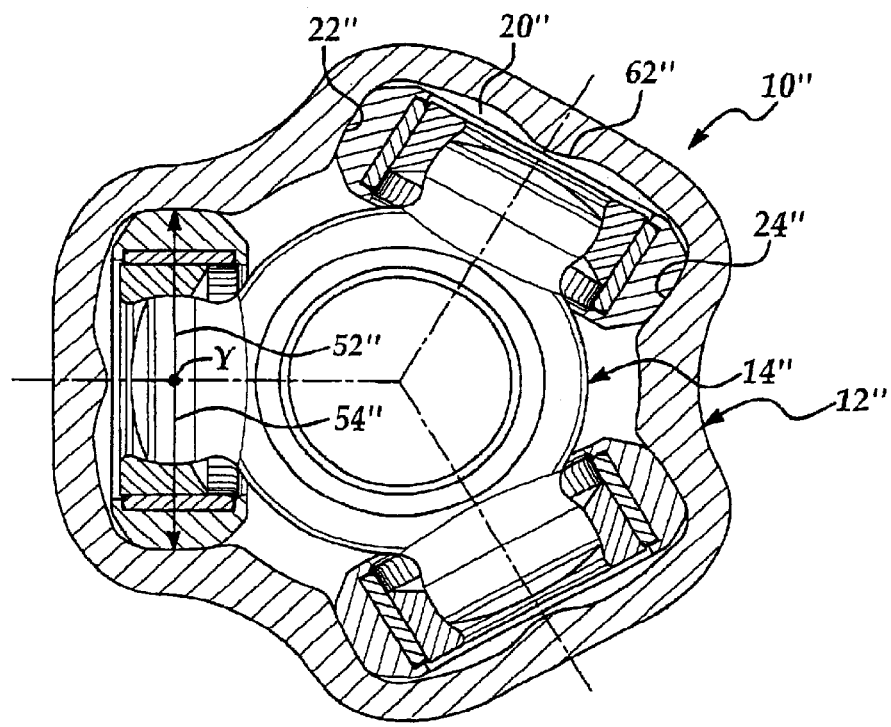
FIG. 6 is a lateral cross section view of a third embodiment of a tripot universal joint similar to FIG. 5.

FIG. 6 illustrates yet a third embodiment of the present invention wherein the guide walls of the first and second embodiments are absent altogether. The radius 52" of the profile of the side surfaces 22", 24" is substantially the same as radius 52' of the second embodiment. Because there is not longer any frictional contact of ball assembly 16" with the side surfaces 22", 24", the guide walls can be omitted and the guide rail 62" remains, assuring the ball assembly properly tracks within the channel 20".

While the forms of the above mentioned herein disclose herein disclosed constitute a presently preferred embodiment many others are possible. It is not intended herein to mention all the possible equivalent forms or ramifications of the invention; it is understood that the terms used here are merely descriptive rather than limiting and various changes may be made without departing from the spirit or scope of the invention.

I claim:

1. A tripot universal joint comprising:

an outer drive member having a first longitudinal axis and three longitudinal drive channels disposed parallel to the longitudinal axis and equally spaced circumferentially from one another, each one of the three longitudinal drive channels defined by two opposing concave side surfaces and a back surface, the back surface facing radially inward with respect to the outer drive member, the opposing concave side surfaces disposed parallel to one another and separated circumferentially with respect to the outer drive member by the back surface;

an inner drive member having a second longitudinal axis and three radial trunnions equally spaced circumferentially from one another and on respective coplanar radial axes which intersect the second longitudinal axis at a spider center, each one of the three trunnions having a circular surface disposed in the respective longitudinal drive channels and being in confronting relation with the opposing concave surfaces of the outer drive member;

three ball assemblies constructed and arranged to rotate and wobble about the radial axis of the respective trunnion, each one of the three ball assemblies contacting and encircling the circular surface of the respective trunnion, and having a semi-spherical outer ball being in rolling contact with one of the two opposing concave side surfaces of the outer drive member and a radial side wall facing radially outward with respect to the outer member; and the back surface of the drive channel having a guide rail projecting radially inward and extending longitudinally lengthwise to the channel, the guide rail being spaced circumferentially between the two opposing side surfaces so that the radial side wall of the outer ball contacts the guide rail longitudinally at one of two spaced positions along the guide rail depending upon the direction the ball assembly tilts relative to and along said first longitudinal axis of said outer drive member as it pivots about an X-axis disposed coplanar to the radial axes of the three trunnions and disposed perpendicular to the radial axis of the respective trunnion.

2. The tripot universal joint set forth in claim 1 comprising:

each one of the opposing side surfaces having a lateral cross section profile having a radius; and the ball assembly having a maximum radius, wherein the radius of the side surface profile is substantially equal to the maximum radius of the ball assembly.

3. The tripot universal joint set forth in claim 2 wherein the guide rail is centered along the back surface.

4. The tripot universal joint set forth in claim 3 comprising:

the ball assembly having a center line about which the outer ball rotates, the center line being co-linear to the radial axis of the trunnion when the first longitudinal axis of the outer drive member is co-linear to the second longitudinal axis of the inner drive member; and the outer ball having a radially outward facing semi-spherical tread face engaged to one of the two opposing side surfaces, the radius of the ball assembly extending radially outward from a center point of the ball assembly lying along the center line and to the tread face.

5. The tripot universal joint set forth in claim 4 wherein each one of the three roller assemblies has a bearing train disposed radially between the trunnion and the outer roller.

6. The tripot universal joint set forth in claim 5 wherein each one of the three roller assemblies has a semi-spherical inner ball disposed radially between the trunnion and the bearing train.

7. The tripot universal joint set forth in claim 6 wherein the circular surface of the trunnion is semi-spherical and slideably engages and conforms to an annular concave mating surface of the inner ball.

8. The tripot universal joint set forth in claim 7 wherein the bearing train is a series of needle bearings disposed directly between a cylindrical inner surface of the outer ball and a cylindrical outer surface of the inner ball.

9. The tripot universal joint set forth in claim 8 wherein the outer ball has two thrust shoulders projecting radially inward from the cylindrical inner surface of the outer ball, the series of needle bearings being disposed axially between the two thrust shoulders with respect to the center line of the ball assembly.

10. The tripot universe joint set forth in claim 9 comprising:

each one of the longitudinal drive channels of the first drive member having two guide walls extending lengthwise longitudinally along the channel and projecting radially inward from and defined by the back surface, the guide walls being spaced circumferentially apart; and wherein the outward radial side wall of each one of the outer balls contact one of the guide walls carried within the respective channels of the outer drive member when the ball assembly pivots about a Y-axis disposed substantially parallel to the respective channel and interesting transversely the X-axis.

11. The tripot universal joint set forth in claim 1 comprising:

each one of the longitudinal drive channels of the first drive member having two guide walls extending lengthwise longitudinally along the channel and projecting radially inward from and defined by the back surface, the guide walls being spaced circumferentially apart; and wherein the outward radial side wall of each one of the outer balls contact one of the guide walls carried within the respective channels of the outer drive member when the ball assembly pivots about a Y-axis disposed substantially parallel to the respective channel and interesting transversely the X-axis.

12. The tripot universal joint set forth in claim 11 comprising:

each one of the opposing side surfaces having a lateral cross section profile having a radius; and the ball assembly having a maximum radius, wherein the radius of the side surface profile is substantially less than the maximum radius of the ball assembly.

13. The tripot universal joint set forth in claim 12 wherein the first guide wall forms contiguously into the first side surface and the second guide wall forms contiguously into the second side surface.

14. A tripot universal joint comprising:

an outer drive member having a first longitudinal axis and three longitudinal drive channels disposed parallel to the longitudinal axis and equally spaced circumferentially from one another, each one of the three longitudinal drive channels defined by opposing concave first and second side surfaces and a back surface, the back surface facing radially inward with respect to the outer drive member, the first and second side surface s disposed parallel to one another and separated circumferentially with respect to the outer drive member by the back surface;

the first and second side surfaces each having a lateral cross section profile having a radius;

an inner drive member having a second longitudinal axis and three radial trunnions equally spaced circumferentially from one another and on respective coplanar radial axes which intersect the second longitudinal axis at a spider center, each one of the three trunnions having a circular surface disposed in the respective longitudinal drive channels and being in confronting relation with the opposing concave side surfaces of the outer drive member;

three ball assemblies constructed and arranged to rotate and wobble about the radial axis of the respective trunnion, each one of the three ball assemblies contacting and encircling the circular surface of the respective trunnion, and having a radius, a semi-spherical outer ball being in rolling contact with one of the two opposing concave side surfaces of the outer drive member and a radial side wall facing radially outward with respect to the outer member, the radius of the ball assembly being substantially equal to the radius of the first and second side surface profiles; and the back surface of the drive channel having a guide rail projecting radially inward and extending longitudinally lengthwise to the channel, the guide rail being centered and spaced circumferentially between the two opposing side surfaces so that the side wall of the outer ball contacts the guide rail when the about an X-axis disposed coplanar to the radial axes of the three trunnions and disposed perpendicular to the radial axis of the respective trunnion.

* * * * *